March 15, 1966 H. F. CLAUSEN ETAL 3,240,508
WEIGHT TRANSFER MEANS FOR FRAME SECTIONS OF POTATO PLANTER
Filed March 30, 1964 3 Sheets-Sheet 1
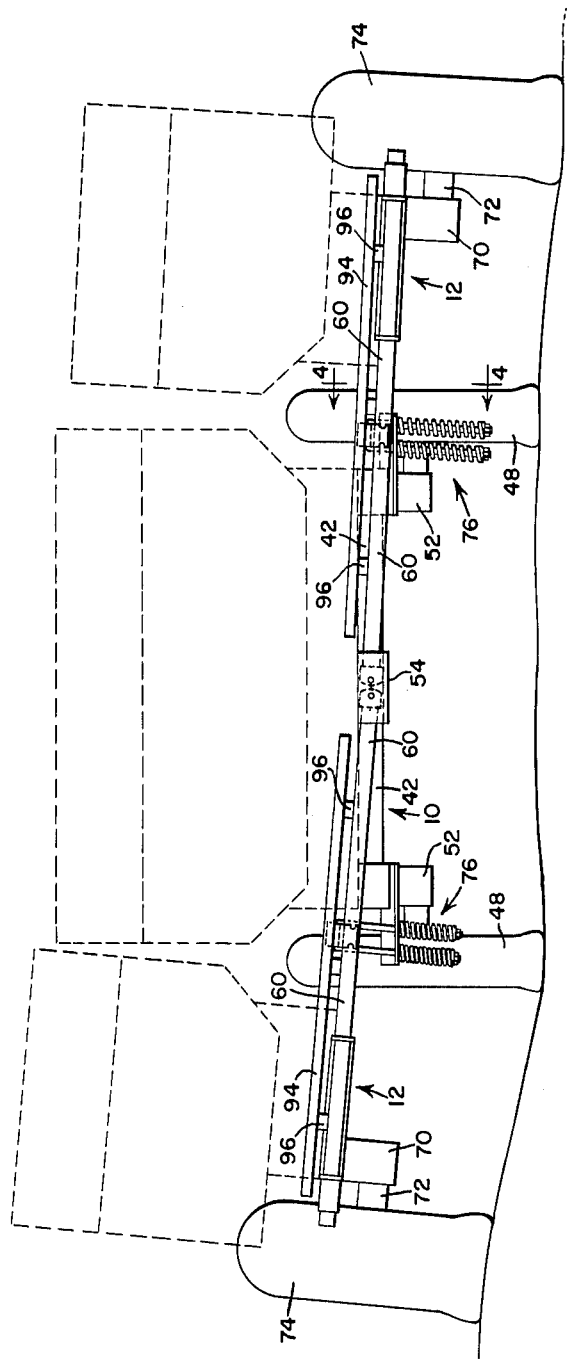
FIG. I
INVENTORS
HOWARD F. CLAUSEN
LEON F. SANDERSON
BY
ATTORNEY

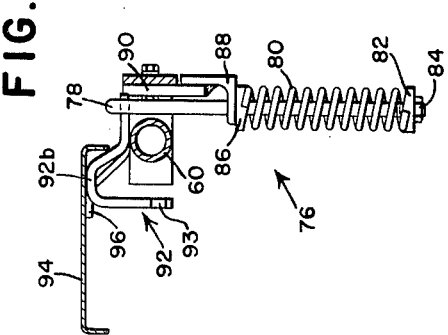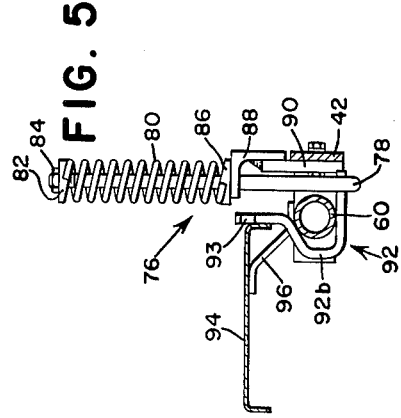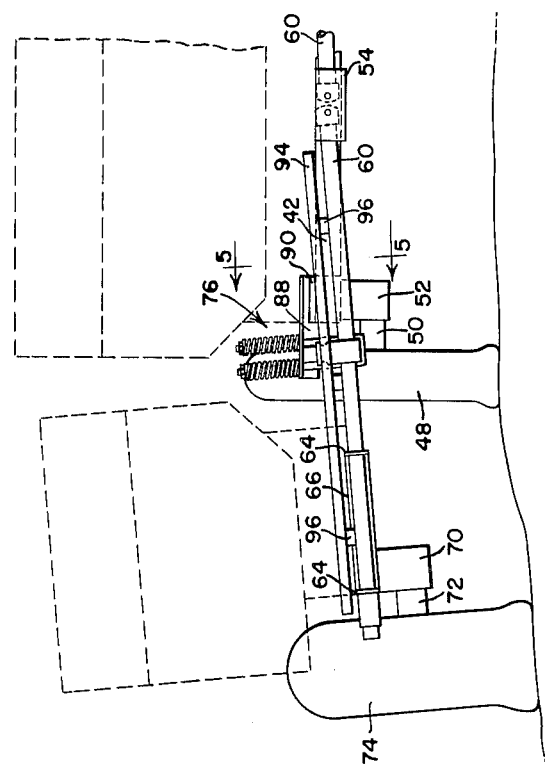

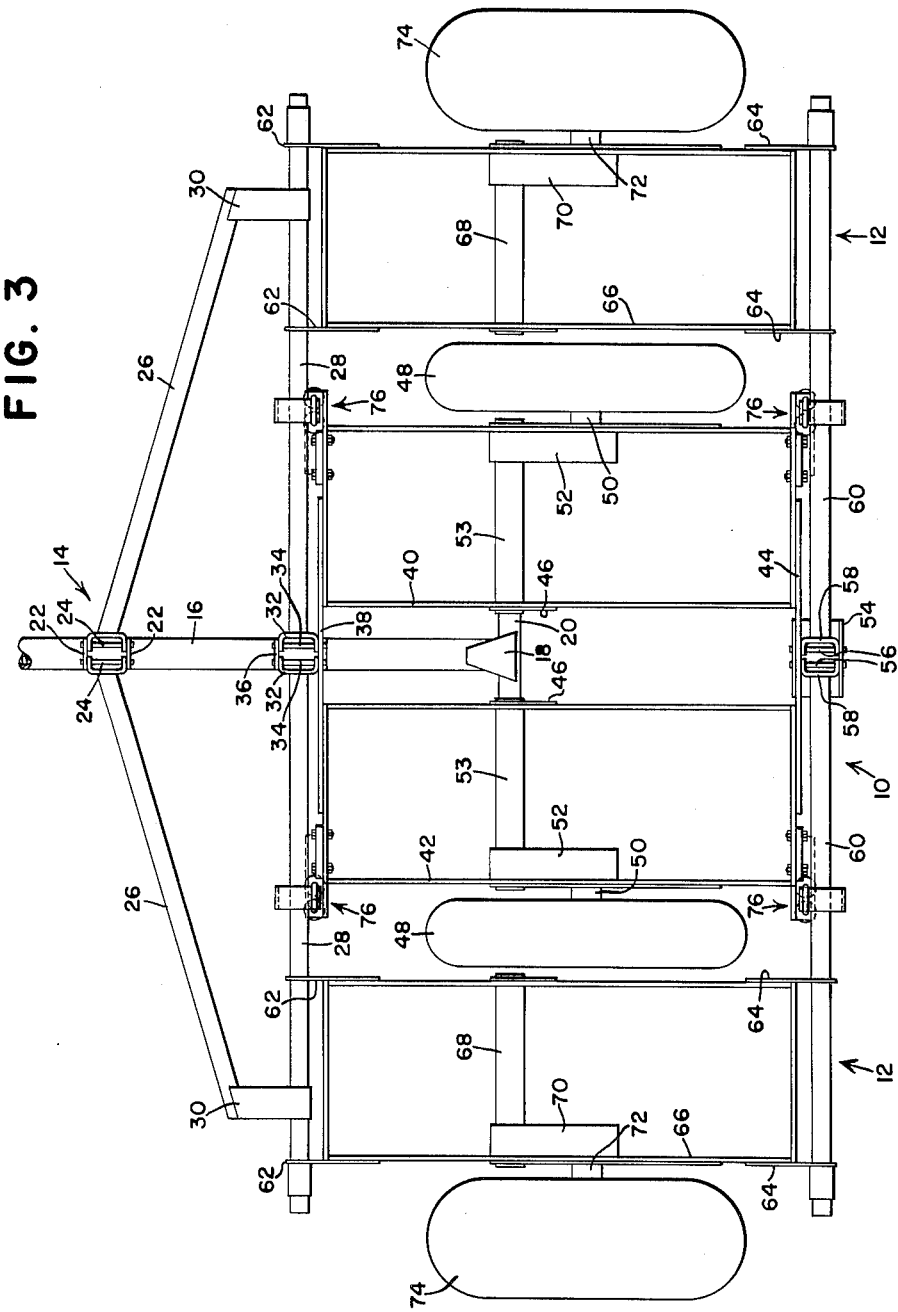

United States Patent Office 3,240,508
Patented Mar. 15, 1966

3,240,508
WEIGHT TRANSFER MEANS FOR FRAME SECTIONS OF POTATO PLANTER
Howard F. Clausen and Leon F. Sanderson, Des Moines, Iowa, assignors to Deere & Company, Moline, Ill., a corporation of Delaware
Filed Mar. 30, 1964, Ser. No. 355,784
2 Claims. (Cl. 280—80)

The present invention relates generally to agricultural implements and more particularly to multi-row potato planters.

One object of this invention is to provide, in a multi-row planter having a central frame structure and outer frames that are movable relative to the central frame structure, spring means adapted to transfer weight from either the outer frame structure to the central frame structure or vice versa.

A further object of the present invention is to provide a novel spring mounting construction for use in transferring weight from a central frame structure to a relatively movable outer frame structure.

These and other objects and advantages of this invention will be apparent to those skilled in the art after a consideration of the following detailed description, taken in conjunction with the accompanying drawings, in which the preferred form of this invention is illustrated.

FIG. 1 is a somewhat schematic rear view of a four-row potato planter in which the weight distributing means of the present invention has been mounted to transfer weight to the outer wheels, the hoppers being shown in broken lines.

FIG. 2 is a view somewhat similar to FIG. 1 in which a portion of a four-row planter is shown in which the weight distributing means has been mounted to transfer weight to the inner wheels.

FIG. 3 is a plan view with certain parts omitted for clarity of the frame structure of a potato planter provided with weight distributing means.

FIG. 4 is a side view taken along the lines 4—4 in FIG. 1 showing the weight transfer means adapted to transfer weight to the outer wheels, and FIG. 5 is a view taken along the lines 5—5 of FIG. 2 showing the weight distributing means adapted to transfer weight to the inner wheels.

In the following description right-hand and left-hand reference is determined by standing to the rear of the potato planter and facing the direction of travel.

Referring first to FIGS. 1 and 3, a four-row potato planter is shown in which the principles of this invention have been incorporated. The four-row planter includes a central frame structure indicated generally at 10, and right-hand and left-hand outer frame structures indicated generally at 12. The potato planter is adapted to be propelled forwardly over a field by a conventional farm tractor (not shown) or any other conventional propelling device, the farm tractor or propelling device being secured to the potato planter through means of a hitch device indicated generally at 14. The hitch device includes a forwardly extending draft bar 16 which is secured at its rear end by means of upper and lower gusset plates 18 to a transverse spindle 20. An intermediate portion of the draft bar 16 is provided with two upwardly extending transverse ears 22 which carry two longitudinally extending pivot pins 24. Journaled about the pivot pins 24 are the inner ends of outrigger braces 26. The outrigger braces are in turn rigidly secured to forward outrigger arms 28 through means of brace plates 30 which are welded or otherwise secured at either end to the outrigger braces 26 and the outrigger arms 28. The inner ends of the forward outrigger arms are secured for pivotal movement about the draft bar 16 by means of yokes 32 which are rigidly secured to the arms 28, the yokes being journaled about pivot pins 34 which are in turn carried by means of a forward ear 36 and a rear transversely extending bar 38, the ear 36 and bar 38 being in turn rigidly secured to the draft bar 16.

The central frame structure 10 is composed of two right- and left-hand rectangular subframes 40 and 42, respectively. The subframes are rigidly secured together at their forward ends by means of a front transversely extending bar 38 and are secured together in a similar manner at their rear ends by a rear transversely extending bar 44. It should be noted that each subframe structure is adapted to carry a seed hopper, fertilizer hopper, and conventional disk openers and coverers for placing fertilizer material and seed into the ground. The spindle 20 is secured to the subframes 40 and 42 by means of plates 46 which rigidly interconnect the spindle to the innermost portion of the frames 40 and 42. Inner land wheels 48 are carried by stub axles 50 that are in turn carried by rock arms 52 secured to rock sleeves 53 which are journaled for rotation about the spindles 20. The arms 52 are caused to be actuated in a manner not material here; however, it should be noted that when it is desired to plant, the arms 52 are caused to be raised thus lowering the frame relative to the ground and when it is desired to transport the planter the frame is caused to be raised by rotation of the rock arms 52.

A U-shaped member 54 is rigidly secured to the midportion of the rear transversely extending bar 44 by means of its forward leg, and longitudinally extending pivot pins 56, interconnect the front and rear legs of the U-shaped member. Yokes 58, which are rigidly secured to the inner ends of rearward outrigger arms 60, are pivotally disposed about the pivot pins 56.

The outer frame structures 12 are secured to the front and rear outrigger arms 28 and 60, respectively, by means of forwardly and rearwardly extending plates 62 and 64, respectively, the plates being rigidly secured at one end to the outrigger arms 28 and 60, and rigidly secured at the other end to a rectangular subframe 66. A rockshaft 68 is journaled for rotation on each of the subframes 66 and carries at one end thereof a rock arm 70 which in turn supports a stub axle 72 on which is mounted a land wheel 74. The rockshaft 68 is caused to be rotated in a conventional manner, not material here, and it should be noted that the rocking of the rockshaft 68 is done concurrently with the rocking of the rockshaft 53.

As can be seen from FIG. 3 it is possible to mount land wheels and tires of greater width on the outside stub axles 72 than is possible on the inner stub axles 50. To this end it should be noted that by employment of the instant invention it is possible to transfer weight from the relatively narrow tires 48 to the relatively broad tires 74. This is important in areas where the inner wheels will not give enough flotation to support the relatively great weight that is borne by these tires, as when both the seed and fertilizer hoppers are filled. It should also be observed at this point that the outer frames are pivotally secured to the inner frames to permit the depth of each planter unit to be gauged by the tire adjacent to it.

To transfer weight from one of the inner units 10 and the outer units 12 to the other, spring means, indicated generally at 76, are mounted on each corner of the inner frame 10 and are adapted to bear against a midportion of the outrigger arms 28 or 60. To transfer weight to the outer units, the spring means are arranged in the manner shown in FIGS. 1, 3, and 4 and include a U-bolt 78 which has disposed about its legs compression springs 80 which are held in place by means of washers 82 and nuts 84 mounted on the ends of the legs of the U-shaped member. The other end of each spring 80 is adapted to bear against another washer 86 which in turn bears against an angle 88. The angle 88 is welded to a plate 90 that is in turn bolted to a transversely extending portion of one of the subframes 40, 42, the angle 88 and plate 90 forming extension means. A bearing or receiving member 92 is provided, the member 92 having notched ends 93 that can receive the bight portion of the U-bolt 78. As shown in FIG. 4, in which the spring member transfers weight from the inner members to the outer members, the bearing or receiving member 92 is disposed with an intermediate portion lying over the outrigger arms 28, 60, one end of the bearing member 92 being engaged by the bight 78 and another portion (92b) bearing against the underside of a platform 94 which is mounted on the arms 28, 60 by means of brackets 96.

In certain applications it may be desirable to reverse the spring device so that it will transfer the weight from the outer units to the inner units. On example of the need for reversing the springs occurred where a planter was pulled by a track-type tractor, in which the fertilizer opener disks pile dirt on top of the compact area left by the tracks and the inner tires of the planter following the tracks ride high on this compact area. The outer tires run in loose ground, and more weight is needed on the inner unit to obtain uniform depth of planting for all four units. To obtain weight transfer to the inner units it is only necessary to reverse the spring device 76 in the manner shown in FIG. 5. In this reversed position the spring pushes against the top of the rectangular frame 40, 42 through means of the angle 88 and plate 90, and pulls upwardly against the outrigger arms 28, 60 by means of the bight portion of the U-bolt 78 which engages the bearing or receiving member 92, the bearing member in turn bearing against the underside of the outrigger arm and being held in place by its contact with the platform 94 that is supported by brackets 96 on the outrigger arm.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

We claim:

1. In a potato planter frame construction including a central frame adapted to support a seed hopper, inner ground-engaging wheels mounted adjacent the sides of said frame, outer frames adapted to support seed hoppers, each of said outer frames being disposed adjacent one of said inner ground-engaging wheels, outer ground-engaging wheels mounted adjacent the outer sides of each of said outer frames, arm means rigidly secured to said outer frames and extending inwardly, and means pivotally securing the arm means to said central frame; the combination therewith of extension means rigidly mounted on said central frame and extending outwardly towards said outer frames, spring means, and means interconnecting said spring means with said arm means and said extension means to transfer weight from one of said frames to the other of said frames, said spring means bearing against said extension means, said interconnecting means comprising a U-bolt, a portion of the legs of said U-bolt passing through said extension means, said spring means being disposed about said legs, fastener means on the ends of said legs to hold said spring means between said fastener means and said extension means, and a U-bolt receiving member having a first portion adapted to receive the bight portion of said U-bolt, said receiving member having a second portion adapted to engage said arm means.

2. The invention set forth in claim 1 in which said second portion of the receiving member engages the arm means in a fulcruming relationship, means mounted on said arm means having a point remote from the engaged portion of said arm, a third portion on said receiving member and adapted to abut against said means on said arm means, the parts being so arranged and constructed that the spring means acting through said U-bolt tends to rotate said receiving member, and said means mounted on said arm means resists rotation of said receiving member.

References Cited by the Examiner

UNITED STATES PATENTS

| | | | |
|---|---|---|---|
| 1,938,132 | 12/1933 | Broemmelsick et al. | 172—310 X |
| 2,074,419 | 4/1937 | Opolo | 280—489 X |
| 2,453,941 | 11/1948 | Smit | 280—489 X |
| 2,463,140 | 3/1949 | Bihn | 280—489 X |
| 2,498,888 | 2/1950 | Hyland et al. | 172—629 X |
| 2,586,246 | 2/1952 | Moffett. | |
| 2,641,886 | 6/1953 | Graham. | |
| 2,731,901 | 1/1956 | Tye | 172—456 X |
| 2,858,145 | 10/1958 | Wilson | 280—483 |
| 3,014,540 | 12/1961 | Youngberg | 172—311 X |
| 3,054,462 | 9/1962 | Anderson | 172—626 X |

BENJAMIN HERSH, *Primary Examiner.*

KENNETH H. BETTS, *Examiner.*